United States Patent [19]
Hazard

[11] Patent Number: 5,177,790
[45] Date of Patent: Jan. 5, 1993

[54] METHOD FOR GENERATING A RANDOM NUMBER IN A DATA PROCESSING SYSTEM/AND SYSTEM FOR IMPLEMENTING THE METHOD

[75] Inventor: Michel Hazard, Mareil sur Mauldre, France

[73] Assignee: Bull CP8, Trappes, France

[21] Appl. No.: 741,519

[22] PCT Filed: Dec. 18, 1990

[86] PCT No.: PCT/FR90/00923
§ 371 Date: Aug. 9, 1991
§ 102(e) Date: Aug. 9, 1991

[87] PCT Pub. No.: WO91/09381
PCT Pub. Date: Jun. 27, 1991

[30] Foreign Application Priority Data
Dec. 19, 1989 [FR] France ............... 89 16768

[51] Int. Cl.⁵ .................................. H04K 1/00
[52] U.S. Cl. ........................ 380/28; 380/23; 380/50
[58] Field of Search .......... 364/717; 380/22, 23, 380/24, 25, 28, 48, 49, 50; 235/379, 380, 382

[56] References Cited
U.S. PATENT DOCUMENTS 4,544,833 10/1985 Ugon ........................... 235/380 X
4,807,288 2/1989 Ugon et al. ..................... 380/25 X
4,825,052 4/1989 Chemin et al. ................... 235/380
4,907,270 3/1990 Hazard et al. ..................... 380/20
4,951,247 8/1990 Kruse et al. ..................... 235/380
4,965,828 10/1990 Ergotti, Jr. et al. ............. 380/49 X
4,974,193 11/1990 Beatelspacher ................. 380/25 X

OTHER PUBLICATIONS

Computer Network & ISDN Systems, vol. 14, Nos. 2-5, 1987, pp. 389-395; Ph. Van Heurck "TRASEC: National Security System for EFTs in Belguim".

Primary Examiner—Tod Swann
Attorney, Agent, or Firm—Kerkam, Stowell, Kondracki & Clarke

[57] ABSTRACT

In a data processing system using portable objects (1) such as cards incorporating memory chips (11, 12, 13, 14, 15) and a processing circuit (10), where a first memory zone (11) is electrically erasable and writable at the request of the processing circuits in the object, random numbers are generated taking into account a first parameter taken from the first zone (11) and at least one second parameter written in a second, nonvolatile zone (12) of the object, the content of this second zone being modified each time the first zone is erased such that the combination of parameters is never identical following the various erase operations on the first zone.

22 Claims, 1 Drawing Sheet

METHOD FOR GENERATING A RANDOM NUMBER IN A DATA PROCESSING SYSTEM/AND SYSTEM FOR IMPLEMENTING THE METHOD

The invention described herein is related in subject matter to application Ser. No. 07/741,520 filed concurrently herewith and entitled: "Method For Generating A Random Number In A System With Portable Electronic Objects, And System For Implementing The Method". Said application corresponds to French application 89.16769 filed Dec. 19, 1989 and PCT application PCT/FR 90/00924. The subject matter of said U.S. application is hereby incorporated by reference.

The invention relates to a method for generating a random number in a data processing system, and to a system for implementing the method.

Random numbers are known and used in data processing systems, particularly when there is a need to perform encoding or encryption of data, for instance before their transmission between two stations connected to one another. The concept of connection should be understood broadly, and applies both to stations some distance from one another, connected by at least one transmission line, and to stations incorporated in the same housing or quite close to one another.

A method for data encoding or encryption comprises causing one of the stations to generate the random number, and then performing an operation of encryption of data before the data travel over the transmission line, with the aid of an encryption function which may be more or less complicated; as input parameters, this function uses the data, the random number, and an encryption key, among other elements.

In such a case, an encryption function is memorized in each of the stations, for example in the form of an algorithm recorded in an encryption module, and for a station receiving an encrypted message or information to be capable of deciphering it, it must include a deciphering module that makes it possible to perform an operation on the encrypted message it receives, so that it can retrieve the original message.

It is understood that the station in which the deciphering is performed must have knowledge of the random number, and generally of all the parameters used for the encryption.

Numerous patent applications in the name of the assignee of the present invention or mention systems that implement data encryption and deciphering algorithms, and show various ways of using random numbers, particularly in systems with microcircuit cards, also known as memory cards and/or microcalculator cards, depending on the complexity of the circuits they include. Once such published application is French application 2 601 535.

The advantage of using a random number to encrypt data or information is obvious: The same encrypted datum with different random numbers produces a different encryption outcome, so that a defrauder finds it difficult to simulate beforehand the outcome of the encryption.

More or less complex solutions, depending on the degree of security or conditions of access that it is desirable to assign to the system, are conceivable.

In these information processing systems, the term random number is generally used in fact to designate the outcome of calculation performed on various parameters, which may for instance be contained in certain memory zones.

As a result, if the parameters used for calculating a random number prove to be identical in two different calculations, then the outcome of these two calculations is the same.

Thus if a skilled defrauder could successfully determine what the parameters used to generate the random number are, and could thus be capable of determining in advance what the next random number calculated would be, then he could determine in advance what the outcome of the encryption applied to an already-encrypted datum would be.

This is why the likelihood that the same random number would be used repeatedly must be reduced as much as possible, so as to limit the risk of fraud as much as possible.

Hence in systems with electronic microcircuit cards, random numbers are used to encrypt the data that are to pass either locally or between the memory or the microcircuits on the card and the terminal to which it is connected, or between the card and a central data processing unit, by way of the circuits of the terminal. The list of data or information that can be encrypted is not absolutely limiting, and encryption of any type of data is conceivable, since it is necessary to assure that they have a certain confidentiality. Similarly, the encryption can occur at any arbitrary phase in the life of a card, that is, either at the time of its manufacture and particularly when it is personalized, or when it is used by a final user, after the information provider has turned it over to him. Upon personalization, the confidential data that are written in the card can for example be encrypted; at the time of use, the data that must be sent to the terminal can be encrypted and recognized by certain circuits of the terminal, without the need for intervention by any person.

In certain cases or phases of implementation, the random number is generated by the card from the data contained in the control memory of the card. The control memory is a memory zone the contents of which are modified each time the card is used, for instance to memorize fraudulent attempts at use, or even errors, or any other type of control operations required by the particular use for which a particular card is intended. This is the case, for example, in French Patent Application published as No. 2 601 535 in the same of the present applicant. In this application, it is provided that the random number is sampled directly in the control zone of the memory, and constitutes the word of the control zone that has been modified at the time of the most recent use. To economize on memory, each modification of the control zone generally affects a number of bits lower than that which each word of this zone contains. As a result, since a memory is normally divided into words of n bits, each word being located in a different address, the contents of a word located at a given address is capable of being modified multiple times, such that the contents of a word located at a given address of the control memory may be used multiple times to constitute the random number, since it changes each of these times.

This solution, which comprises using the words of the control zone, is not completely satisfactory, since once one word has been completely modified, a word located at a different address is used; consequently the contents of the word having the different address can successively assume the configurations of the word of the preceding address, resulting in retrieval of the same random numbers. Consequently, a defrauder who would have observed the preceding series of random numbers would be capable of determining the outcome of an encryption in the case where a random number already used would be used again to encrypt the same datum. This is why the use of not only the contents of a word in the control zone located at a given address but also of an element taking the value of the address itself into account has been conceived, such that the random number is constituted by the combination of this element representing the value of the address and the word itself. This combination should be understood broadly; that is, it may be the outcome of a calculation using the representative element of the value of the address and the contents of the word, or it may be any other logical or juxtaposition operation bearing on the word in question and its address.

The concept of "use", which dictates the modification of the control zone, should also be taken in the broad sense, and may have various meanings. A first meaning is to consider that a use is constituted by all the operations that can take place in the course of one session, that is, between the instant when a card is inserted into the connector of a terminal, and the moment when it is withdrawn. Thus in such a case, the same random number is used for each intermediate operation that takes place between the insertion and the removal of the card. This is not a hindrance a priori, because in the same session it is not very likely that the system will be led to encryption of the same datum twice. The second meaning that can be given to the notion of use is to consider that each intermediate operation performed in one session constitutes a use. In such a case, the same session, a plurality of random numbers will be generated to encrypt the data. The second solution has the advantage of greater security, in the case where the same datum would come to be encrypted at least twice in the same session. On the other hand, it involves a much greater consumption of memory, since the control zone is modified in each operation.

The notion of memory consumption is extremely important, particularly in systems that employ portable objects such as electronic microcircuit cards. It will be recalled that an electronic microcircuit card is a card that on the inside of its body includes a set of electronic microcircuits that may comprise memories and/or microcalculators. In one such type of card, during the same session, or in other words between the introduction and the removal of the card, several items of information contained in memory may be modified, or new information may be written, depending on whether or not it is important to memorize these items of information. It will also be recalled that the memory typically includes a control zone that can be modified in each elementary operation or in each session. Consequently, depending on the frequency of use and the number of writing operations that are performed, the memory of the object may be consumed more or less rapidly. In a banking application, for example, each debiting or crediting operation may be memorized, as can each error in writing the confidential code. Multi-use cards can even be imagined, which may have a plurality of completely different applications; thus one can imagine using the same card for banking applications, and for making telephone calls in public telephone booths, for example.

When the memory is used up completely, the portable object incorporating it must be exchanged, and the result is an increase in the cost price of such a system. This is why for certain applications the use of electrically erasable and reprogrammable memories has been conceived of, these being known as EEPROMs, for the initials of the English words for these memories. This makes it possible to lengthen the service life.

In such a case, the confidential data, such as the data necessary for identifying the cardholder, the serial number of the card, and other data as well which are written in the phases known as personalization of the card, will be stored in a non-erasable memory zone, or again the data necessary between the instant of erasure and future uses would be retained, for instance in a buffer memory.

In such a case, it is imagined that the control zone can also be erased at the moment of erasure of the other memory registers, since the control enables verification of the writing operations that have taken place since the card was put into service, or since an erasure in the case where an erasure has already taken place. It is accordingly conceived that in such a case, each of the words of the control zone can assume a configuration that it has at the time of a preceding use prior to the erasure, so that a skilled defrauder, by having observed the preceding operations, could simulate the operations of encryption that have already taken place and could deceive the system, if the random number is obtained from the data of the control memory.

The object of the method of the invention is to overcome these disadvantages, and it applies to a data processing system using a portable object, such as an electronic microcircuit card, in which operations of encryption of data or information are performed, by using random numbers obtained from parameters contained in the memory of the portable object, certain of the memory zones of the portable object also being capable of re-initialized or erased, so as to lend the portable object a longer service life.

According to the invention, a method for generating a random number in a data processing system, employing at least one portable object including processing circuits and at least one first memory zone that can be written and is capable of being erased on the request of the processing circuits, said method consisting causing at least one first parameter contained in the first zone to be taken into account, and is characterized in that it consists in causing a second parameter, written in a second writable and non-erasable memory zone of the portable object, to be taken into account, and combined with the first parameter, to calculate the random number, and that the contents of the second zone are modified by the processing circuits of the object each time the first zone is erased, such that in case of or following such an erasure, the first parameter resumes a value identical to a value that it would have had between the first placement in service of the portable object and the most recent erasure, the combination of parameters is different and the random number becomes unforeseeable.

Thus because at least two parameters are taken into account, at least one of which does not repeat, a skilled defrauder cannot foresee in advance the outcome of the combination of the first and second parameters so that it must be assumed that the outcome is effectively a number that is random to the eyes of an external observer.

Preferably, the algorithm of the function used for combination between the two parameters is memorized in a zone accessible for reading only by the circuits of the portable object, inside this object, and if needed, after being calculated, the random number is transmitted from the portable object to the terminal, so that the terminal can use the random number either to perform encryption on the data that must be transmitted from the terminal to the portable object in encoded form, or to decipher or verify data transmitted in encoded form from the portable object to the terminal.

In one embodiment, the first zone, containing the data capable of being erased, is an electrically eraseable programmable memory zone (EEPROM), while the second zone is an electrically programmable memory (PROM), for example.

Further characteristics and advantages of the present invention will become more apparent from the ensuing descriptions taken in conjunction with the drawings, in which.

Figure 1:
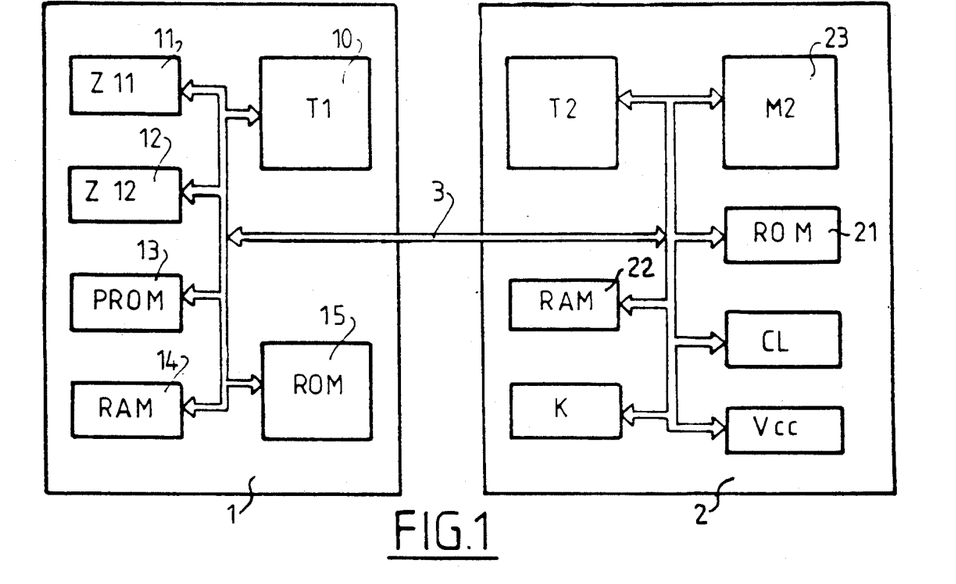
FIG. 1 is a basic diagram of a data processing system that enables the implementation of the method of the invention.

In FIG. 1, the basic diagram of a system for implementing the method according to the invention has been shown. The system includes a portable object (1), such as an electronic microcircuit card, and at least one terminal (2) to which this card can be connected, by way of suitable connection means, not shown.

When the portable object is connected to a terminal, it establishes an electronic linkage, in a manner known per se, by way of a linking bus (3), achieved by way of connection means. The linking bus (3) may include means for the exchange of data between the portable object (1) and the terminal (2), as well as means to assure the electrical supply necessary for the functioning of the circuits of the portable object, from a supply source Vcc disposed inside the terminal (2). The terminal (2) may also be interconnected with other terminals or with a central processing unit that has not been shown, in the case where the system forms a more complex network.

A random number, when it is used at the time of encryption, enables confidential data to be sent in encrypted or encoded form between the terminal and the portable object, in either direction. Hence the terminal (2) or the portable object (1) must both be capable of encryption of the data or information that are to be sent by one to the other, whenever this proves necessary. For this reason, the portable object (1) includes processing circuits (T1) that enable at least the encryption of the data that must be transmitted in encoded form in the direction of the terminal (2), and to decipher the data received from the terminal, and the terminal (2) has processing circuits (T2) to encrypt the data or information that it must send in encoded form to the portable object, and to decipher the data received from the portable object.

The data that it may be necessary to encrypt are for example confidential authorization codes that must pass from one of the elements of the system to the other. Thus the terminal includes a keyboard (K), for example, so that the user can enter his personal authorization code, for example. This authorization code may be sent for verification purposes to the processing circuits (T1) of the portable object, and if it is desired to prevent it from being intercepted when it is on the transmission line 3, then it is necessary to transmit it in encoded form. After transmission, the encoded information received by the portable object is decoded and then compared with a corresponding datum contained in the memory of the portable object, in order to authorize the continuation of the transactions.

Other methods may be employed to verify the validity of the personal identification code entered on a keyboard. For instance, instead of performing the verification inside the portable object, this can be done inside the terminal. In that case, the secret identification data that are contained in the memory of the portable object (1) must travel over the transmission line (3) in the direction of the terminal in encoded form.

It can thus be appreciated that in either case, it is necessary to encrypt these confidential data, and in such a case it is preferable to use a random number, so that the same confidential datum traveling multiple times over the transmission line (3) will travel each time in a different form, to prevent a defrauder from being capable of simulating the sending of this datum in its encoded form.

In accordance with the present invention, a random number is attained with the aid of parameters contained in the memory of the portable object. It us not necessary, but is however preferable, that at least one parameter serving to obtain the random number in the portable object be secret, and consequently accessible only to the processing circuits (T1) of the portable object.

In accordance with the present invention, the portable object (1) includes a first zone (11) of memory (Z11), the data or information contained in which may be erased, for example when the memory becomes saturated. This memory is of the EEPROM type, for instance, and erasure is done under the control of circuits (10) for processing (T1) of the portable object. Moreover, this memory zone (Z11) may be divided into a plurality of elementary sub-zones can be accessible by all of the system, while others are accessible only under the control of the circuits (10) for processing (T1) of the portable object, for either reading or writing. In other words, certain subzones may be secret.

Among the elementary subzones that this zone (Z11) contains may be the control zone that has been mentioned above. This zone is accessible for both reading and writing from the outside, and contains information that for example makes it possible to reconstitute the various phases of use of the card. Thus when an access code is entered incorrectly on the keyboard, the control zone may keep track of this erroneous attempt at access. The same true for successful attempts, or other conspicuous events that should be kept track of.

The portable object (1) contains a second zone (12) of memory (Z12), the contents of which are modified each time the first zone is erased. Preferably, this zone is not eraseable (PROM). It is the presence of this zone that according to the present invention makes it possible to prevent the next random number that is to be calculated by the system from being determinable in advance. It is in fact from this second zone (12) that the second parameter Y used for generating or calculating the random number is extracted, the first parameter X being extracted from the first zone (11) mentioned above. The constitution of the parameters will be explained in greater detail hereinafter.

The number of possible uses of the card depends on the size of this second zone (12), because when this zone is full, it is no longer possible to use the card. This is why when the systems detects that this second zone (12) is full, it prevents any further use of the portable object.

Finally, the portable object may contain a third zone (13) of the PROM type, containing data that must remain during the entire service life of the card. Some of these data are confidential and are accessible for reading only by the processing circuits (T1) of the portable object; these are, for example, the data that enable authentication of the card holder. Others are not confidential, such as the data that enable verification of certain conditions for use of the object. Data contained in this third memory zone (13) of the portable object (1) may be for reading authorized at all levels of the system; these are for instance the serial number of the portable object, which is written at the time of its manufacture. This zone may also include, in the form of data, the instructions necessary for the flow of the programs that are to be used by the processing circuits (T1) of the portable object, in particular in the phases of data encryption.

In general, this third zone (13) contains all the data that are capable of being re-used after each erasure of the first zone (11), because they are necessary for implementation of the system.

It is understood that the data for the implementation of the system may differ from one application to another. Moreover, the data capable of being placed in the third zone and which is then listed above have been given solely by way of illustrative and non-limiting example. In certain applications, the serial number of the portable object does not appear, for instance.

In parallel, the terminal (2) may include a plurality of memory zones (21, 22) of the ROM and RAM type, and other types (23) of memory (M2) intended for memorizing data or information necessary for implementation of the system, whatever the data that are to be memorized in definitive or temporary fashion, and a processing circuit (T2).

By way of illustration, the encrypted data or information that are transmitted by the portable object may be stored temporarily in the memory portion (23) of the terminal in order to be processed, and moreover the terminal may contain a memory zone (21) of the ROM type which contains the data or information constituting the instructions for function of the processing circuits (T2) of the terminal.

The terminal may also include a clock circuit (CL), which enables sequencing of the various operations of the system; in that case, it is the clock circuit associated with the terminal (2) that is used to cause the processing circuits (T1) of the portable object (1) to function.

In a variant that is not shown, the portable object (1) includes its own clock circuit, which is then used when only internal operations are required.

In addition, the portable object (1) contains for example a volatile random access memory (14) and a ROM-type memory (15), in which the data necessary for functioning of the system are written in volatile fashion at the time of each session of the portable object. For example, the instructions comprising the operating program of the portable object, which can be memorized permanently in the non-volatile zone (15), are loaded at the beginning of each session into the random access memory (RAM) (14) from this unalterable zone. This is known per se in the field.

Figure 2:
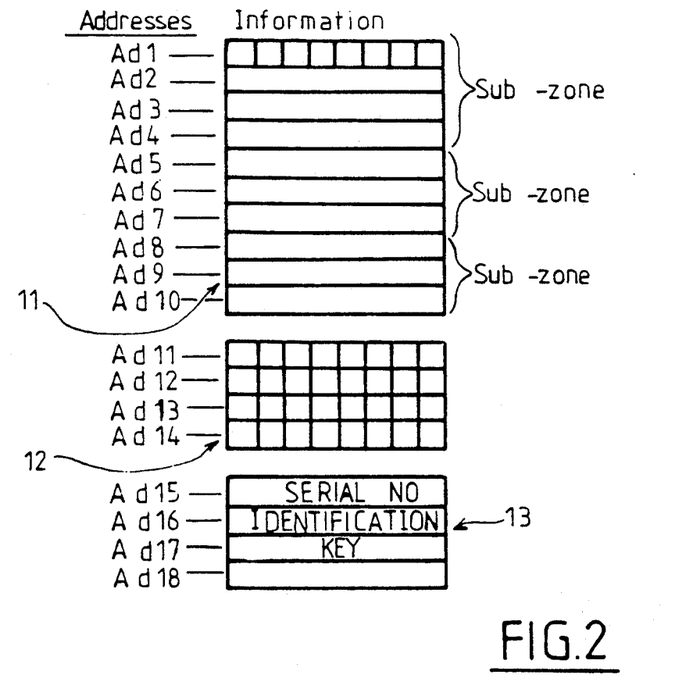
FIG. 2 shows the memory of a portable object enabling the implementation of the method of the invention.

FIG. 2 illustrates the principle of organization of the memory of a portable object enabling the implementation of the method of the invention.

The memory contains three main zones (11, 12, 13), which can be subdivided if needed into elementary subzones.

The first zone (11) is the one that contains the data or information that can be erased when this zone is saturated, to permit the re-use of a portable object.

The information that may be found in this zone are for example, in the case of a portable object that can be used for banking applications, information relating to debits and credits, and consequently information relating to the balance on the portable object; it may also be information relating to messages that can be sent to the system, or received from the system, and in general any information of which it is important to keep track, at least instantaneously from one application to another, for the sake of possibly making later verifications.

Generally, according to the present invention, this zone is the one that contains the data that there is no necessity of maintaining for the entire service life of the card, and which are written during the various uses. In the applications intended, various types of data may be written successively in this zone, which may as applicable be divided into a plurality of elementary subzones. Thus this zone may contain one access subzone which memorizes the data relating to attempts at using the portable object that incorporates this memory. In this access subzone, each time access is attempted whether or not successfully, information is written so that the system can detect how unsuccessful successive attempts have taken place, and if applicable can block the use of the portable object.

These means employed to keep track are not the subject of the present invention, but what has just been described shows that the majority of the data that have been written, either since the first time the portable object was put into service before a first erasure, or since the most recent erasure, can be erased, taking care to preserve the information necessary between two erasures, which consequently, at the time of the next erasure, can in turn be erased.

Another type of information that it may be necessary to preserve at the time of an erasure, and which it will not be necessary to preserve at the time of the next erasure is the balance on the portable object, for example, when it is intended for banking applications. By definition, the balance is a value that changes, which may accordingly be modified between two successive erasures but which at the moment of an erasure can be preserved so that it can be carried forward after the erasure.

The list is not limiting, and it is as a function of the application that the information provider determines the data that will have to be rewritten after an erasure, and which accordingly will have to have been memorized temporarily, for instance in a RAM memory of the object, or in another buffer memory of the system.

According to the present invention, the first zone (11) is erasable, so that it can be rewritten. In a preferred embodiment, to prevent its being eraseable accidentally, this memory zone, or the subzones it includes, are organized around an electrically eraseable and reprogrammable memory, that is, this memory zone is an EEPROM type memory, the name for which comes from English (electrically eraseable programmable read only memory), which enables its erasure to take place under the control of the processing circuits of the portable object. This type of memory, to be erased, in fact requires the application of a voltage, called the programming voltage, and of a signal for validating erasure. In the known electronic circuits of this type, the supply and operating voltages are on the order of 5 V, while the erasure or programming voltage is on the order of 20 V.

In a variant, the first zone is of the EPROM type, and can for example be erased by exposure to ultraviolet light. Each word of the memory is locatable by its address. In the example shown, the first zone (11) contains ten words, of eight bits each, which is absolutely illustrative and does not conform to actuality, since in the known applications for memory cards, the memory words have 32 bits, and a transaction zone may contain an even larger number of words. The only limit that in fact exists is due to the size of the portable object in which such a memory is to be incorporated.

In a manner known per se, the addresses may be absolute or relative; that is, to differentiate between two successive addresses, either the number of bits constituting each word is taken into account, or to pass from one word to the other, the addresses are incremented by one unit.

In FIG. 2, a total of 18 words has been illustrated for the three zones (11, 12, 13), the addresses of which range from Ad1-Ad18.

The second memory zone (12), according to the present invention, is the one that is modified upon each erasure of the first zone (11), to prevent a defrauder, after an erasure, from being capable of determining in advance, by having observed the preceding sequences, the random number that will be generated. The way in which this zone is modified, and in which it is used in generating the random number, and the nature of the parameters that are used in the first zone (11) to serve as a basis for calculation of the random number, will all be described hereinafter. This second zone (12) is of the PROM type: That is, once it has been written, it can no longer be erased. The modification is irreversible. Accordingly, this second zone is specifically reserved for the second parameter.

The third zone (13), finally, is the one that contains the confidential data written in order to differentiate the portable object that contains them. This zone (13) may for instance contain a serial number, data identifying the bearer of the portable object, data indicating he usage of the object, and other data necessary for the applications intended for the object, and which must be preserved between two successive erasures.

This zone (13), like the second one, may be of the programmable, non-eraseable type (PROM), and/or of the read-only type (ROM), the data that it contains being written there by masking. Moreover, and in a manner known per se, some of the data contained in this zone may be accessible for reading by all or part of the system, depending on the degree of confidentiality intended to be granted then. In this case, accessibility for reading by all or part of the system may be determined with the aid of keys, for instance constituted by the first bits of each of the words in question. Depending on the configuration of these bits, the processing circuits (T1) of the portable object determine what the degree of accessibility or confidentiality of the word in question will be.

At this stage in the description, it is appropriate to note that in the first zone (11), some words can also be associated with a key that prevents them from being accessible for reading by certain elements of the system, and the key is of the same type as the one that protects the words of the third zone (13). Generally, this may happen in any of the memory zones, and in particular, to lend greater security to the random number, the second zone (12) may be accessible only to the processing circuits (T1) of the object.

As noted above, the second and third zones may have exactly the same electronic structure (PROM), and are then disposed on the same portion of the component, with the processing unit (T1) of the portable object determining the limit between the two zones, with the aid of the calculation of the addresses of the words contained in each of these zones.

The same zone may be divided into a plurality of subzones, with each subzone containing a given type of information. Other definitions are important for better comprehension of the ensuing description.

On the one hand, the term "operation" should be mentioned. An operation may be understood as being a debiting or crediting order bearing on a given amount, in the case of a banking application; then again, it may be the acquisition of a confidential code, or sending of a message and so forth.

On the other hand, a session is a phase that is included between the moment when a portable object is connected to a terminal and the moment when it is disconnected, so that a plurality of applications may takes place during the same session.

In accordance with the present invention, the calculation of a random number can be performed as follows.

At least one first parameter X is extracted from the first erasable, reprogrammable zone (11), and is used in a calculation making use of a second parameter Y extracted from the second zone (12), in which at least one datum is written upon each erasure, such that this zone (12) evolves during the entire service life of the card. Thus in the case where the first parameter X after an erasure is identical to a parameter that has already been extracted following a preceding erasure, the combination of the parameter X with the new parameter Y causes the generation of a different random number.

The combination between the two parameters may be performed with the aid of a more or less complex function, which is preferably memorized in the circuits of the portable object, for example in zone (15) of the ROM-type memory. The function may bring about a simple concatenation of the parameters X and Y, or a logical operation, such as a logical AND, a logical OR, or any other comparable known function, between the two parameters; or again, it may bring about an encryption (f) of one of the parameters by the other, such as the random number (RND): $RND = f(X, Y)$.

The first parameter X, acquired in the first zone (11), may be constituted by one or another item of information that it contains, and preferably information that is capable of being changed in each session performed with the portable object is selected.

For example, in the case of a portable object such as a microcircuit card intended for banking applications, at least two values exist that are capable of change in each session: These are the information relating to the balance, and the control information, such that a choice can be made between one or the other of these items of information.

It is understood that this is not limiting, and depending on the application for which the portable object is intended, other choices are conceivable.

In the various types of applications known thus far, the processing is done on the words having a given form, expressed in bits. Thus as has been explained in the example shown, it is assumed that only words of eight bits are processed. Writing of information can affect an entire word. In the case of a banking application, information relating to a balance, or to a debit, or to a credit, is translated into a message encoded in the n bits comprising a word, such that upon a later operation of the same type, that is, a later debiting or crediting operation, the recording of this later operation will result in the modification of a new word in the subzone representing debiting, or of a new word in the subzone representing crediting, and possibly, finally, the writing of a new word in the subzone of the balance, indicating the new balance.

In other words, if the amount of the debit is written in encoded fashion on a word located at an address Adx in the debiting subzone in a debiting operation, then a later debiting operation is translated into the writing of the amount of this new debit in a word located at a different address, for example the word having the absolute or relative address Adx+1 immediately higher than the address Adx of the word that had been written previously.

Contrarily, other operations translate into the modification of a number of bits less than the total number of bits that a word contains. Only when the bits of a word have been used is the next word is modified. This is the case for example with information relating to successful or unsuccessful attempts at capturing a confidential code, which are encoded differently depending on whether the attempt succeeded or not, and which are memorized one after another in the control memory.

Moreover, in this case, if one has begun to modify a word, and the next information one wishes to write requires a number of bits greater than the number of bits that remain available in that word, then one begins to write this information in the word that has already been broached, and the remaining bits are then written into the next word.

These characteristics in the management of the memory zone are known in the prior art and do not enter into the scope of the present invention but they are utilized here.

In view of the foregoing, it can be seen that each session can be translated into the modification of at least one word in one of the subzones of the first zone (11), and preferably the first parameter X is selected in a subzone of which it is known that its contents have been modified in each session, and in this subzone, the last word modified previously is selected as the parameter X.

Moreover, it may happen that between two successive erasures, two words located at different addresses in the subzone where the parameter X is sampled may have the same contents. In that case, to prevent the random number obtained from being the same, the parameter X is constituted from the last modified word, and from the representative value of its address (Adx) in memory. Accordingly, the parameter (X) is a function of the word and its address.

This first variant embodiment is selected either when a random number have been used only once during one session, so that it is necessary to encode only one datum during this session, or when a plurality of data are capable of being encoded, but using the same random number. In this latter case, the random number calculated must be memorized in view of its being re-used during the same session.

It may happen that for some types of application, no datum or information has been modified in the first zone (11) during one session. In such a case, if there has been no erasure whatever of the first zone between the last session and the current session, then the random number of the future session will be calculated from the last word modified in the first zone, and accordingly will be the same as the one that would have been calculated during the preceding session. It follows in this hypothesis that in the case where the processing circuits (T1) of the portable object would be led to encrypt the same datum as during the last session (for example, the confidential code), the outcome of the encryption would be the same, since the random number would also be the same. A defrauder could use this possibility to cheat the system. This is why, in a variant, to overcome this disadvantage, provision is made that the first zone (11) includes a specific subzone, the contents of which can be modified bit by bit each time a random number is requested, such that upon a later request for a random number, the next random number is calculated at least from a parameter that takes into account the contents of this specific subzone, as it has been modified in the preceding request for a random number.

It will be appreciated that this solution is expensive in terms of memory, but it may be necessary in some cases.

In a variant that has recourse to this specific subzone, it is provided that the parameter X, extracted from the first zone (11), takes into account not only the contents of this specific subzone but also the contents of the subzone of the first zone (11) of which there is a strong probability that it has been modified during a session. In this variant, to economize on memory in the specific subzone, the processing circuits (T1) of the portable object detect whether the contents of the subzone capable of being modified during an ongoing session have indeed been modified during that session. In the case where a modification has taken place in this subzone, then the contents of the specific subzone are not modified during the session. Contrarily, if the subzone capable of changing its contents has not been modified during the session, then at the instant the session ends the processing circuits (T1) of the portable object modify the contents of the specific subzone, in such a way that in the next session, a request for a random number is translated into a different outcome.

To implement this variant, it suffices for the processing circuits of the portable object to verify whether or not a change has taken place in the subzone capable of being modified at the time of each session.

To this end, it may be provided that at the time of a session, an indicator of a change of state of the non-specific subzone is written, for instance into the volatile RAM-type memory zone (14). The presence of this indicator, at the end of the session, indicates to the processing circuits (T1) of the portable object that a change has taken place in the zone capable of being modified, and contrarily, its absence signifies that no change has taken place: Thus in this latter case, the processing circuits (T1) of the portable object order the modification of the specific subzone.

It is possible to imagine other measures to verify that a change of state has taken place in the non-specific subzone, examples of such measures being, at the beginning of the session, memorizing the address and/or contents of the last unchanged word at the beginning of the session, and then at the end of the session, searching for the address and contents of the last word modified in the non-specific subzone. In the case where the address and contents are identical, this means that no change has taken place, and in that case the state of the specific subzone should be modified. In the case where the address or contents have been modified, it is unnecessary to modify the state of the specific subzone.

In a variant, only a specific subzone is used to determine the parameter X, the state of this specific subzone being modified in each session. In that case, the parameter X is determined by the address and contents of the last modified word in the specific subzone. In that case, the specific subzone is preferably modified bit by bit, to reduce the memory consumption.

However, this solution is less powerful, and the solution described earlier is clearly preferable, which comprises providing a specific subzone that is not modified except when another subzone, serving to determine the parameter X has not been modified in the course of the session.

According to the present invention, whether the parameter X is a function of the content of a single word of a specific or non-specific subzone, or whether it results from the combination of a plurality of words distributed in one or more subzones, this parameter X is combined with the second parameter Y, which is extracted from the second zone (12) modified at the time of each erasure of the first zone (11). Preferably, the parameter Y is constituted by the last modified word in this second zone, and by the value of the address of this last modified word, to prevent the parameter Y from being capable of having the same value twice. Moreover, preferably, the modification of this second zone (12) takes place bit by bit upon each erasure, so as to provide maximum economy in the memory size of the portable object, since the modification of this second zone is irreversible. When the second zone has been completely modified, the portable object becomes unusable. This is why a method of writing in this zone that consumes the least possible amount of memory is used.

As indicated earlier, the second parameter Y is preferably accessible only to the processing circuits (T1) of the portable object.

The method of erasure of the first zone is not part of the scope of the present invention. However, it may be noted that a priori, it can take place at any arbitrary moment of the current session, either because this first zone (11) is completely full or because one of its subzones is full, and the system seeks to write new information in this subzone.

It is accordingly the system, and in particular the processing circuits (T1) of the object, that determine the moment at which the erasure takes place. Moreover, preferably, writing of a new datum in the second zone (12) takes place as soon as the system has decided that the first zone should be erased, and prior to the performance of this erasure.

It is understood that in the case where the data contained in the first zone will be necessary after its erasure, they can be memorized prior to the erasure and then rewritten after erasure into this zone. The temporary memorization can be done for example in the volatile RAM-type memory zone (14) of the portable object, which is automatically reset to its initial state when the portable object is disconnected from the system.

The type of data or information that it may be necessary to memorize so as to write it in the eraseable memory depends on the application for which the portable object is intended. In the case of a portable object intended for banking applications, for instance, it may involve the balance before erasure, and the last operation performed before the erasure.

In addition, in a preferred mode of implementation, the random number is generated by taking into account an additional parameter specific to the portable object in question. This may for instance be the serial number of the portable object, or a secret identification datum specific to the portable object and unknown to the bearer himself. In this latter case, it may be a diversified key, that is, a key written into the memory of the portable object and calculated by employment of an encryption algorithm that takes into account the serial number of the portable object and a personalization datum.

In a preferred embodiment for implementation, in the case where it is necessary to use a random number several times during the same session, a provision is made for a change of random number as many times as necessary during the session. In the case where the same datum must be encrypted several times during the same session, this provision prevents a skilled defrauder from succeeding in cheating the system.

Several variants may be imagined to enable the generation of a plurality of different random numbers during the same session.

A first variant comprises creating, the first memory zone (11), another specific subzone, which is modified each time a random number is requested. In such a case, the parameter X can be determined exclusively from the last modified word in this specific subzone, and from the address of this word, without requiring combining it with some other element of this first zone.

However, this solution has the disadvantage of consuming a great deal of memory, since each generation of a random number is accompanied by the modification of at least one bit in the specific subzone, solely for the needs of generating the random number.

It is understood that the first random number X is combined with the second parameter Y extracted from the second zone written upon at each erasure, and optionally with a third parameter specific to each portable object, extracted for example from the third zone (13). Preferably, this third parameter is secret.

A second variant is applicable when there is no specific subzone in the first zone (11). In that case, the first parameter X is constituted by a datum that evolves constantly in the course of the session. In one mode of implementation, the evolving datum is constituted by the contents of a counter, sampled in the volatile memory zone, which translates in digital form into a number of events that have taken place since the beginning of the current session. This counter is re-initialized at the beginning of each session.

One event that may be counted in the number of requests for random numbers, and the counter is incremented upon each random number request. This solution is particularly advantageous and economical, since the contents of the counter are written in only a single word of the volatile memory (14). Moreover, depending on the operating format of the processing circuits of the portable object, before the contents of the counter return to zero or in other words return to the state they had before the beginning of the session. it is possible to count a more or less high number of random number requests.

Thus if the operating format of the processing circuits of the portable object is eight bits, the counter resumes the value of digital zero after 255 random number requests.

In the case of a 16-bit operating format, which is the usual format for applications in which the portable object is a microcircuit memory card, the counter can count 65,535 events before returning to the value of digital 0.

It would of course be possible to count other events, such as the clock pulses of the clock circuit (CL) associated with the system. However, the associated clocks may have frequencies of several megahertz, so that in the course of the same session, the counter would have to return to 0 several times, and it would be possible that during the same session, it would resume a value that it had already had before, which would make it possible to determine the value of the parameter X in advance.

However, in an improved variant, it is provided that in case the counter is exceeded, in other words that it returns to 0 during one session, then the processing circuits (T1) of the portable object bring about the modification in state of the second memory zone (12), which is normally written upon during each erasure of the first zone. The effect is the resumption of its original state by the counter upon an erasure thereof.

As a result, if the contents of the non-specific subzone and the contents of the counter during one session are identical to contents that they have had during the same session, or at the time of another random number request, then the parameter X will not be modified with respect to what it was before, but the modification in state of the second zone (12) at the time of the passage of the counter to 0 will cause the parameter Y to be different.

It is understood that in the majority of applications, this precaution proves to be needless, especially if the counter counts the random number requests, which are rarely capable of exceeding a number on the order of several tens during the same session.

A third variant is applicable when there are no non-specific subzones the contents of which are capable of changing upon each session.

In that case, a specific subzone that is modifiable in each session, preferably bit by bit, is created in the first eraseable zone (11), and the parameter X is established on the basis of the last modified word in this specific subzone and on the address of this last modified word, and on the contents of the counter that functions identically to what has just been described with respect to the second variant.

Finally, a last variant is applicable when there is a non-specific zone that is highly likely to be modified during each session, and a specific subzone the contents of which are modified at the end of the session if the contents of the non-specific subzone have not be modified.

In that case, the parameter X is a function of the last word modified in each of the subzones in question, of the respective address of this last word in each of the subzones, and of the contents of a counter that count the same type of the elements as in the preceding variants.

In these last two variants, in the case where the counter exceeds its capacity and resumes a value identical to a value already used during the current session to generate a random number, then preferably the state of the specific subzone is modified to modify the parameter X, if the state of the non-specific subzone has not evolved, thus avoiding the same calculations of random numbers.

This solution, which consists in modifying the state of the specific subzone if the capacity of the counter is exceeded, is preferable to another solution, which one could imagine, which would consist in modifying the state of the second zone (12) written upon during each erasure. In fact, as has been explained above, this second zone (12) is modifiable irreversibly, so that when all the elementary memory elements have been modified, the portable object is no longer usable.

On the other hand, a modification of the specific subzone, when this specific subzone has been completely modified, translates into an erasure of the first zone (11).

Thus, in a simple manner, the invention makes it possible to solve the problems foreseen, that is, the method described makes it possible to generate numbers that can be considered perfectly random, since the user of a portable object employing the method of the invention cannot determine in advance what the value of the random number will be, even if he knows the parameters serving to determine the random number used in an encryption, in particular when the memory containing data some of which constitutes some of the parameters used for generating the random number have been erased. In fact, the method of the invention makes it possible, after the erasure of this memory zone, for at least one other parameter taken into account not to be identical when the portable object is put back into service after this erasure, so that when the parameters of the first zone (11) assume a value identical to a value they already had prior to a preceding erasure, the combination of the various parameters already used cannot be reproduced for the same portable object. It is not possible to foresee in advance the random number that will result from the parameters used.

In addition, in a preferred embodiment, a datum specific to each portable object is used, to prevent its being possible to determine the random number from results obtained with the aid of another portable object.

The invention is applicable to a system for implementing the method, in which the portable object is a memory card with electronic microcircuits, for example, in which it is necessary to encrypt certain data prior to transmitting them to the rest of the system. The encryptable data may be identification data, message data, or any other type of data for which a certain confidentiality at the time of transfer is necessary.

I claim:

1. A method of generating a random number (RND) in a data processing system, employing at least one portable object (1) including processing circuits (T1) and at least one first memory zone (11) that can be written to and is capable of being erased on a request from the processing circuits (T1) of the portable object, the method comprising causing at least a first parameter (X) contained in the first memory zone to be taken into account, and being characterized in that it consists in causing at least one second parameter (Y) written in a second non-volatile zone (12) of the portable object, to be taken into account, in combination with the first parameter (X), to calculate the random number, and that the contents of the second zone are modified by the processing circuits of the object each time the first zone is erased, such that in the event of, or after, such an erasure, the first parameter (X) resumes a value identical to a value that it would have had between the first time the portable object was put into service and the most recent erasure.

2. The method of claim 1, characterized in that constituent elements of the first parameter are selected in the first zone (11), such that the first parameter (X) cannot occur twice with the same value in the course of two sessions not separated by an erasure of this first zone.

3. The method of 1 or 2 claims, characterized in that the second zone (12) comprises words that are each locatable by an address and each contain a predetermined number (n) of bits, and that the second parameter (Y) comprises the last modified word of the second zone and the address of this word.

4. The method of claim 3, characterized in that the n bits of one word of the second zone (12) are modified one after the other in the course of a plurality of successive erasures, such that a word located at a given address assumes a plurality of different successive values at the time of these successive erasures.

5. The method of claims 1 or 2, characterized in that the first memory zone (11) is divided into subzones each containing information of different types, the modification of information in a subzone translating into a modification of at least one bit of one word of this subzone, and that the first parameter (X) is established on the basis of at least one item of information of one subzone the contents of which change at least once during each session, and using the address in memory of this information.

6. The method of claim 5, characterized in that the first memory zone (11) contains at least one subzone for memorizing information relating to the operations performed with the portable object, and the contents of which change at least once during each session, by modification of at least one memory element of this subzone, called the non-specific subzone, and that the first parameter (X), used to generate at least one random number in combination with the second parameter (Y) during the session, is established on the one hand on the basis of the last word modified in this non-specific subzone and on the other hand on the basis of the value of the address in memory of this word.

7. The method of claim 5, characterized in that the first memory zone (11) contains at least a subzone, known as the specific subzone, which is modified at least one during a session, and that the first parameter (X) is established at least on the basis of the contents of the last word modified in this specific subzone and of the value of its address in memory.

8. The method of claim 7, characterized in that when during a session the counter resumes its initial value, the contents of the specific subzone are modified.

9. The method of claim 5, characterized in that the first zone (11) contains a non-specific subzone, the contents of which are highly likely to change at least one during a session, and that it comprises detecting, at the end of a session, whether the contents of said nonspecific subzone have effectively been modified and that it comprises modifying, at the end of the session, the state of a subzone known as the specific subzone, solely if it has been detected that the contents of the non-specific subzone have not been modified during the session, and that the first parameter (X), established at the beginning of the last session, has been established on the basis of the contents of the last word modified of each of these two subzones, and of the respective value of their address in memory, such that the value of the first parameter (X) is unforeseeable from one session to the other.

10. The method of claims 1 or 2, characterized in that, to enable generation of a plurality of different random numbers during the same session, it comprises causing not only the first parameter (X) and second parameter (Y), but also an element that evolves during the current session, to be taken into account in order to develop the random number.

11. The method of claim 10, characterized in that the element evolving during the current session is the contents of an events counter, the digital value of which is written into a volatile (RAM) memory (14) of the portable object (1), such that the contents of the counter are modified each time the event in question occurs, and that the contents of the counter are reinitialized at the beginning of each session.

12. The method of claim 11, characterized in that the events counted by the counter are the number of requests for random numbers during the current session.

13. The method of claim 12 characterized in that when during a session the counter resumes its initial value, the contents of this specific subzone are modified.

14. The method of claim 12 characterized in that, in the case where the first memory zone (11) does not include a specific subzone, and the counter resumes its initial value during a session, the contents of the second non-volatile zone (12) are modified.

15. The method of claim 11, characterized in that the events counted by the counter are clock pulses furnished by a clock circuit (CL) of the system.

16. The method of claim 15 characterized in that when during a session the counter resumes its initial value, the contents of this specific subzone are modified.

17. The method of claim 15 characterized in that, in the case where the first memory zone (11) does not include a specific subzone, and the counter resumes its initial value during a session, the contents of the second non-volatile zone (12) are modified.

18. The method of claim 11 characterized in that when during a session the counter resumes its initial value, the contents of this specific subzone are modified.

19. The method of claim 11, characterized in that, in the case where the first memory zone (11) does not include a specific subzone, and the counter resumes its initial value during a session, the contents of the second non-volatile zone (12) are modified.

20. The method of claims 1 or 2, characterized in that it comprises causing to be taken into account, for the generation of the random number, another parameter, representing a datum specific to the portable object used, such as a datum established on the basis of the serial number of the object or a diversified key, which differ from one object to another.

21. The method of claims 1 or 2, characterized in that at least one of the parameters taken into account for calculating the random number is secret.

22. A system for implementing the method of generating a random number (RND), characterized in that it includes at least one portable object (1) adapted to be coupled temporarily to a terminal (2), the portable object having processing circuit means and at least one first electrically writable, erasable and programmable memory zone (11), and at least one second non-volatile memory zone (12) that can be written under the control of the processing circuit means (T1) of the portable object, when the first zone (11) is modified, in such a way as to be capable of causing at least one random number to be developed in the object, in each current session in which the portable object is connected to the terminal, by a calculation taking into account at least one first parameter (X) sampled in the first zone (11) and modified in each session and at least one second parameter (Y) sampled in the second zone (12) and modified upon each erasure of the first zone.

* * * * *